Oct. 27, 1964

C. A. ZIEGLER 3,154,684

X-RAY ANALYSIS SYSTEM WITH MEANS TO DETECT
ONLY THE COHERENTLY SCATTERED X-RAYS

Filed June 22, 1960

INVENTOR.
CHARLES A. ZIEGLER
BY
Weingarten, Overbuch & Pandiscio
ATTORNEYS

Oct. 27, 1964

C. A. ZIEGLER 3,154,684

X-RAY ANALYSIS SYSTEM WITH MEANS TO DETECT
ONLY THE COHERENTLY SCATTERED X-RAYS

Filed June 22, 1960

INVENTOR.
CHARLES A. ZIEGLER
BY

ATTORNEYS

United States Patent Office 3,154,684
Patented Oct. 27, 1964

3,154,684
X-RAY ANALYSIS SYSTEM WITH MEANS TO DETECT ONLY THE COHERENTLY SCATTERED X-RAYS
Charles A. Ziegler, Framingham, Mass., assignor, by mesne assignments, to Laboratory for Electronics, Inc., Boston, Mass., a corporation of Delaware
Filed June 22, 1960, Ser. No. 37,968
6 Claims. (Cl. 250—71.5)

This invention relates in general to a system for determining the position and shape of a core of high atomic number material within a casing formed of low atomic number material and more particularly to a system for defining the position and shape of the uranium alloy core within a clad uranium reactor fuel element.

One type of fuel element employed in nuclear reactors consists of a uranium alloy material encased in a cladding of zirconium alloy or stainless steel to form a generally rectangular plate. Typically the thickness of cladding in the fuel region will be in the order of .015 inch, and the uranium core which has a generally uniform thickness along most of its length tapers out towards the end of the plate to a knife edge termination at a point a few inches from the end of the plate. The exact position of this knife edge termination of the core must be known in order that further machining and drilling operations may take place on the partially completed fuel element. The dimensional accuracy required is approximately ±.015 inch which approximates the machining tolerances applicable to the element in general.

Various methods have been devised and utilized in the past for determining the end position of the uranium core in the fuel element, and these include destructive testing, X-ray radiography, X-ray absorption gaging and X-ray fluorescence analysis. In the destructive testing method a small number of each group of fabricated fuel elements is cut apart to determine the dimensions and the results of this "spot sample" are then applied to the remainder of the group. This method is inadequate, however, since in the tolerance requirements of reactor fuel elements a statistical determination of the most probable end point is not sufficient, and further any destructive testing involves destroying a number of otherwise usable elements. The use of X-ray radiography is unsatisfactory both because of poor contrast introduced at the tapered end point and because the film introduces errors due to limitations of grain size and film shrinkage. X-ray absorption testing employs X-ray detectors rather than film on one side of the fuel element and measures the absorption of X-rays as a function of position on the fuel element. This technique is again affected by poor contrast from the tapered end point and further, variations in cladding thickness may completely mask out the presence of the uranium. The analytical technique employing X-ray excited fluorescence radiation operates on the basis of detecting radiations from the uranium alloy which are characteristic of it and which are not characteristic of the zirconium cladding; however, the cross section of this effect is relatively small and hence the intensity of the X-ray beam required renders the equipment for performing this analysis excessively complex and expensive. In addition, the time required for inspection of a single fuel element using this method is prohibitive.

It is therefore a primary object of the present invention to provide an economic, accurate system for determining the position and shape of the uranium core in a reactor fuel element.

It is another object of this invention to provide a nondestructive testing system for determining the location and shape of any core of high atomic number within a casing of low atomic number material.

It is still another object of this invention to provide an efficient, high-speed, accurate system for determining the position and shape of a uranium core in a fuel utilizing an X-ray source requiring low power.

Broadly speaking, the apparatus of the present invention determines the position of the uranium alloy core within the fuel element by scanning the surface of the fuel element with a collimated X-ray beam in conjunction with a collimated X-ray detector adapted to respond only to the coherent, or Rayleigh, scattered photons from the X-ray beam. The variation in the quantity of coherent scattered photons as the primary beam moves from the section of the fuel element without core to that containing core provides a clear indication of the terminal point of the uranium alloy core. The sharp response of this apparatus to the presence of uranium is due to the dependence of coherent scattering on the atomic number of the target material. Primary X-rays impinging on a target material are scattered by the atoms of the target incoherently (Compton scattering) and coherently (Rayleigh scattering). The cross section for Compton scattering is proportional to the atomic number, Z, of the scattering atoms while the Rayleight scattering cross section is closely proportional to $Z^3$, and hence the response of a detector measuring only Rayleigh scattering will increase very strongly when the target material changes from a low Z material to a high Z material such as uranium. The Rayleigh scattered photons may be differentiated from the Compton scattered photons on the basis of energy since the Rayleigh scattered photons have the same energy as the primary beam while Compton scattering always involves some degradation of energy of the scattered photons. The Compton scattered radiation is more seriously degraded in energy when the scattering angle is large; hence if the angle between the line of collimation of the impingent X-ray beam and the line of collimation of the detector is made large it is possible to discriminate more strongly against the Compton scattered photons and thereby emphasize the Rayleigh response function.

Other objects and advantages will become apparent from the following detailed description when taken in conjunction with the accompanying drawing in which.

Figure 1:
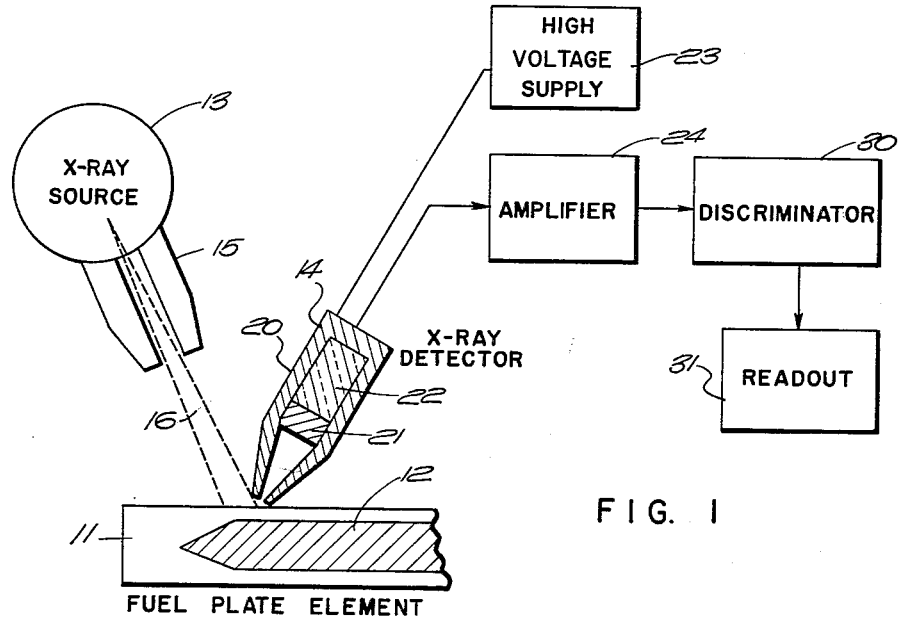
FIG. 1 is an illustration partly in block diagrammatic and partly in cross sectional view of the apparatus of this invention.

With reference now to FIG. 1, a fuel plate element 11 containing uranium core section 12 is shown in cross sectional view. An X-ray source 13 provides a collimated beam of X-rays 15 impinging on fuel element 11. An X-ray detector 14 is located just above the fuel plate element 11 and is collimated to have its field of view intersect the impingent X-ray beam within the fuel plate element. A high voltage supply 23 provides power to the detector element 14 and the output pulses from the detector are fed into amplifier unit 24 and thence through electronic discriminator 30 to read out unit 31. The fuel plate element 11 is generally formed of a material such as stainless steel or zircalloy, the latter being an alloy of zirconium, and contains a uranium alloy core having a general cross sectional shape as depicted at 12 with a tapered edge near one end of the fuel element. The core material generally has a composition of five to ten percent uranium with the remainder zirconium.

The X-ray source 13 may be any conventional type of

Figure 2:
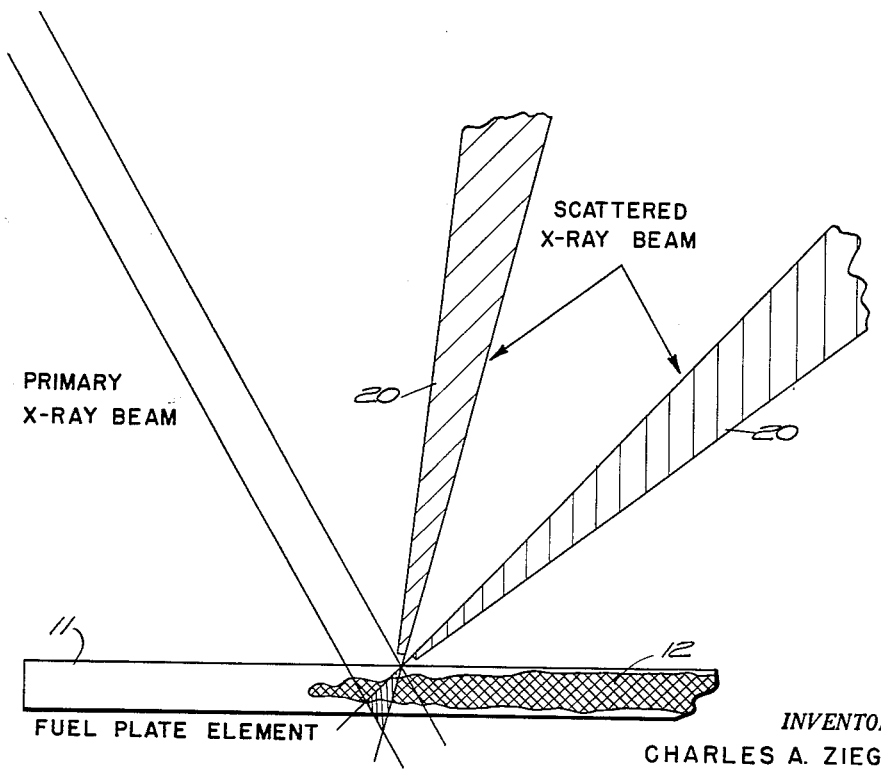
FIG. 2 is an illustration in cross sectional view of a portion of the apparatus in FIG. 1.

X-ray generator capable of producing a radiation beam having a spectral peak in the region from 85 to 135 kilovolts at a beam current of a few milliamperes or larger. The X-ray generator 13 is provided with a collimating element 15 which together with the collimated field of view of the X-ray detector 14 serves to define a "sensitive volume" within the fuel plate element 11. The X-ray detector 14 is typically a sodium iodide crystal 21 optically coupled to a photomultiplier tube 22 with the power for the photomultiplier tube being supplied from a high voltage supply 23. These detector elements are enclosed within a shielding and collimating member 20 which, as a shield, serves to lower the general radiation background and, as indicated in FIG. 2, as a collimator allows only X-rays scattered from a specific volume and in a defined direction to reach the sodium iodide crystal 21. This collimator 20 may be either of the single hole type, as shown, or of the honeycomb type in which the several holes form a single collimating arrangement. The angle formed by the X-ray source collimation and the collimation of the detector determines the angle of scatter of photons impingent upon the sodium iodide crystal 21 and this angle is made large in order to emphasize the Rayleigh scattering and de-emphasize the Compton scattering. A suitable value for this angle is approximately 120 degrees. Since the response of the sodium iodide crystal-photomultiplier combination is proportional to the energy of the impingent X-rays, the output pulses from the photomultiplier have amplitudes proportional to the energy of the initiating X-ray photons. The output of the photomultiplier is coupled to an amplifier 24 which serves to linearly amplify these pulses which are then fed through an electronic discriminator unit 30 to a readout unit 31. The function of the electronic discriminator 30 is to allow only pulses greater than a given magnitude to reach the readout unit 31. The readout unit 31 may be any conventional electronic scaler or count rate meter. The discriminator unit 30 is adjusted so that only pulses resulting from photons at, or near, the maximum X-ray photon energy of the primary beam are passed on to the readout unit. Photons of such energy scattered at large angles can only result from Rayleigh scattering.

The apparatus, as described to this point, provides on the output an indication of the Rayleigh scattered radiation originating from a small sensitive volume (as indicated in FIG. 2) within the fuel plate. In order to find the position of the core within the element the fuel element 11 is moved beneath the X-ray source and detector combination in a predetermined fashion such that the sensitive volume is scanned from the end of the fuel plate element along its length and the presence of core material within the sensitive volume is indicated by the increase in Rayleigh scattered photons due to the presence of the high Z uranium in the core alloy. The traversing mechanism (not shown) may be any conventional means of moving the element, either in a stepwise fashion or on a continuous basis at a predetermined speed. The readout unit 31 should conveniently include a strip chart recorder or other means of recording the pulse output rate from the discriminator as a function of time.

The accuracy of measurement of the present apparatus involves several interdependent factors. Thus the statistical accuracy in determination of the Rayleigh scattered radiation increases with the flux impingent on the detector but the distance resolution is improved by decreasing the sensitive volume defined by the collimators which in turn decreases the flux upon the detector. Again, narrowing the spectrum of the primary X-ray beam by means of filters and rendering the discriminator sensitive only to a very narrow band of energies around the peak energy of the primary beam emphasizes the response of the instrument to Rayleigh as opposed to Compton radiation, but for a given beam current this seriously reduces, once more the flux impingent upon the detector. The selection of the energy peak in the primary X-ray beam also involves a compromise since the Rayleigh scattering cross section decreases as the energy increases, yet the discrimination factor between Rayleigh and Compton scattering improves as the energy increases. Thus lower energy values represent an increased flux of Rayleigh scattered radiation and higher energy values represent better separation between the Rayleigh and Compton response of the detector. It has been found that a primary beam energy spectrum peaking at 90 kilovolts and a detector-discriminator combination responsive to pulses corresponding to scattered radiation energy of 85 to 110 kilovolts provides a suitable response. The collimation of the primary X-ray beam is not critical and a beam confined to an area of one square centimeter on the surface of the target is sufficient. The distance resolution of the apparatus is on the other hand directly dependent on the collimation of the detector. For a collimator located with its entrance hole .05 inch above the plane of the target and a crystal radius of .75 inch the length and diameter of the entrance hole may be derived for a desired distance accuracy of .025 inch. Geometrical considerations show that where the crystal radius is equal to or greater than the penumbra radius, maximum flux is obtained for collimators with zero umbra. The penumbra radius is made equal to the desired distance measurement resolution. The relationships for collimator length, $b$, and collimator entrance hole radius, $d$, may then be expressed as follows:

$$b_{optimum} = \frac{2ac}{X_m}$$

and $$d_{optimum} = \frac{b_{optimum} X_m}{2(a+b)}$$

where $a$=the collimator entrance hole height above the target plane, $c$=the collimator exit radius (the crystal radius), and $X_m$=the penumbra radius (corresponding to the desired distance measurement accuracy). Thus for the dimensions cited above and an accuracy of .025 inch the collimator length should be 3 inches and the entrance hole radius should be .0123 inch.

Figure 3:
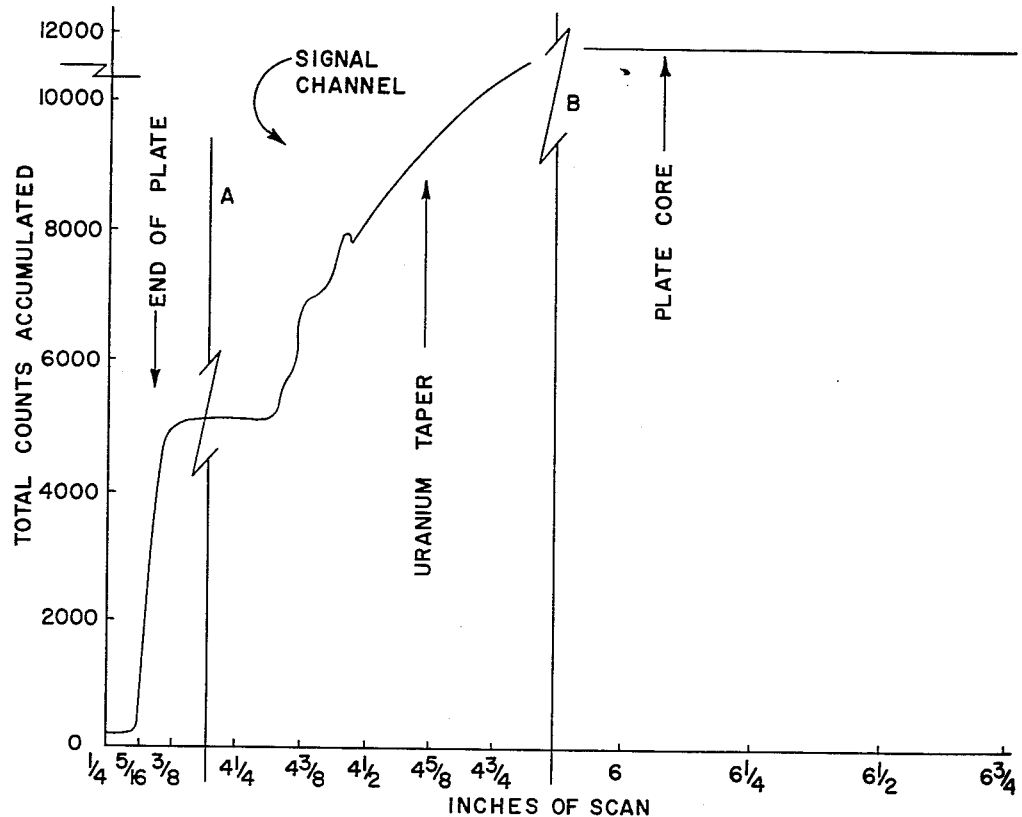
FIG. 3 is a plot of the response of the detector of this invention as a function of position on a reactor fuel element.
Figure 4:
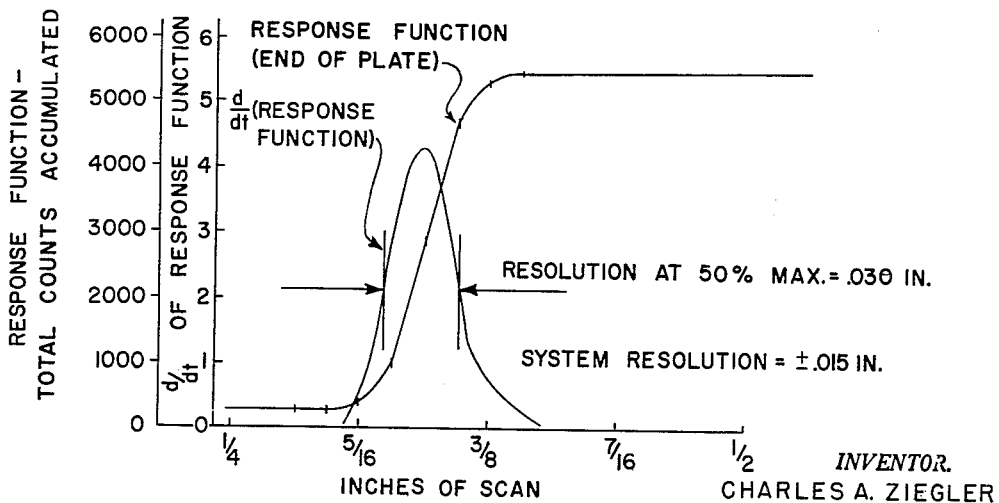
FIG. 4 is a plot of the differentiated response function of the apparatus of this invention.

FIG. 2 is a plot of the response of a system employing a discriminator set to accept pulses corresponding to energies between 95 and 110 kilovolts where the detector employed a photomultiplier tube optically coupled to a 2-inch diameter by 2-inch thick sodium iodide crystal and where the incident X-ray beam had a maximum energy of 135 kev. with a peak value at 90 kilovolts at a beam current of ⅓ milliamp and was collimated to impinge on an area approximately one square centimeter of the fuel element. The penumbra diameter of the detector collimator was .045 inch. The apparatus was moved along the fuel element in discrete steps, each measurement being made for a period of two minutes, and the primary X-ray beam current was one-half milliamp. Under these conditions, the response to the uranium core was enhanced by fluorescence radiation from the uranium. As indicated by the broken lines at A and B the curve in FIG. 2 does not show the entire response curve, but rather typical sections of interest. FIG. 3 is a plot of response function with the differential value of this function superimposed on it, the differential value being taken for the end of the fuel plate itself. As indicated in FIG. 3 if it is assumed that the resolution at half maximum of the differential response function corresponds to the distance accuracy, then the accuracy is .030 inch, corresponding to a system resolution of ±.015 inch. If now an X-ray generator operating at a beam current of 50 milliamps, which is typical for conventional X-ray units, were employed, then this accuracy could be achieved at a scanning speed of ten inches per minute; or if a slower scanning speed were acceptable, then an accuracy of ±.010 inch could be achieved at a scan speed of seven inches per minute employing a collimator with a penumbra of approximately .020 inch in diameter.

As is indicated in FIG. 2, not only the initial point of the uranium alloy core may be determined employing this apparatus, but also the taper slope of the uranium as it increases to its maximum value may be shown by this method.

The apparatus has been described in terms of determining the position of a uranium core inside a shield plate element formed of zirconium alloy; however, the same apparatus will operate with equal efficiency to determine the presence of any high core material within a low Z casing such a lead within tin, and the like. The accuracy of such measurements will, of course, depend upon the relative cross sections of Rayleigh scattering in the two materials at the primary X-ray energy employed. While the apparatus has been described in terms of an X-ray detector formed of a sodium iodide crystal and photomultiplier, any detector capable of producing an energy-dependent response may be used. The amplifier, high voltage, discriminator, and readout unit can be any suitable design adapted to operate with the particular detector used. The apparatus itself may be scanned over the surface of a stationary casing containing the core to be measured, or the apparatus may be maintained stationary and the casing moved by the apparatus in a known pattern.

Thus, while the apparatus has been described in terms of a particular detailed embodiment and application, the invention herein is not so limited. It is obvious that many modifications and improvements may now be made by those skilled in the art and the invention disclosed herein should be construed as limited only by the spirit and scope of the appended claims.

What is claimed is:

1. Apparatus for determining the position of a uranium alloy core within a reactor fuel element comprising an X-ray generator adapted to provide a beam of X-rays within a confined locus on the surface of said reactor fuel element; detector means adapted to respond only to that portion of said X-ray beam which is coherently scattered from said confined locus at a predetermined angle; traversing means adapted to move said fuel element in a manner whereby said confined locus of said X-ray beam scans the surface of said fuel element; readout means coupled to said detector means and adapted to provide an indication of the response of said detector means as said X-ray beam scans the surface of said fuel element.

2. Apparatus for determining the position of a uranium alloy core within a reactor fuel element comprising an X-ray generator adapted to provide a primary X-ray beam having a predetermined energy peak; collimator means adapted to collimate said X-ray beam in a manner to cause said beam to impinge upon a confined locus on the surface of said fuel element; X-ray detector means adapted to provide in response to incident X-rays output pulses having an amplitude which varies in accordance with the variations in the energy of said incident X-rays, second collimating means disposed in such relation to said first collimating means as to limit the X-rays incident upon said detector means to X-rays emitted from said confined locus at a predetermined angle with respect to the axis of said primary X-ray beam; pulse discriminator means coupled to the output of said detector means and adapted to select only pulses having amplitudes corresponding to an energy range in a relatively narrow region about said peak energy of said primary X-ray beam; traversing means adapted to move said fuel element in a manner to cause said confined locus to scan the surface of the fuel element in a predetermined pattern; readout means coupled to said pulse discriminator means and adapted to provide an indication of the pulses selected by said discriminator means as said confined locus is scanned in said predetermined pattern.

3. Apparatus as in claim 2 wherein said discriminator means is adapted to select pulses having amplitudes corresponding to an energy range of 95 to 110 kilovolts.

4. Apparatus in accordance with claim 2 wherein said predetermined angle is approximately 120 degrees.

5. Apparatus for determining the position of a uranium alloy core within a reactor fuel element comprising an X-ray generator adapted to provide a collimated beam of primary X-rays having a predetermined energy peak and incident upon a confined locus on the surface of said fuel element; X-ray detector means adapted to receive only radiations emitted from said confined locus at a predetermined angle with respect to the axis of said primary X-ray beam, said X-ray detector means including a sodium iodide crystal optically coupled to a photomultiplier tube; a source of high voltage coupled to said photomultiplier tube; pulse discrimination means coupled to the output of said photomultiplier tube and adapted to select only pulses having an amplitude corresponding to the dissipation of energy within said sodium iodide crystal of an amount of energy approximately equal to said peak energy of said primary X-ray beam; traversing means adapted to cause said confined locus to scan the surface of said fuel element in a predetermined pattern; readout means coupled to the output of said pulse discriminator means and adapted to provide an indication of the number of selected pulses as said confined locus is scanned in said predetermined pattern.

6. Apparatus for determining the position of a core formed of high Z material within a casing formed of lower Z material comprising an X-ray generator adapted to provide a primary X-ray beam incident upon a confined locus on the surface of said casing; detector means adapted to respond only to that portion of said primary X-ray beam which is coherently scattered from said confined locus in a predetermined direction; traversing means adapted to scan said confined locus in a predetermined pattern over the surface of said casing; readout means coupled to said detector means and adapted to provide an indication of the response of said detector means as said confined locus is scanned over the surface of said casing.

References Cited in the file of this patent

UNITED STATES PATENTS

| 2,688,094 | Dumond | Aug. 31, 1954 |
| 2,901,629 | Friedman | Aug. 25, 1959 |
| 2,997,586 | Scherbatskoy | Aug. 22, 1961 |

OTHER REFERENCES

Determining Cladding Thickness of Fuel Elements by X-rays, by B. J. Lowe et al., from Nucleonics, vol. 17, No. 7, July 1959, pages 70 and 72.